3,323,907
PRODUCTION OF CHROMIUM STEELS
Edward F. Kurzinski, Poland, Ohio, assignor to Air Products and Chemicals, Inc., Philadelphia, Pa., a corporation of Delaware
Filed Nov. 23, 1964, Ser. No. 412,992
5 Claims. (Cl. 75—60)

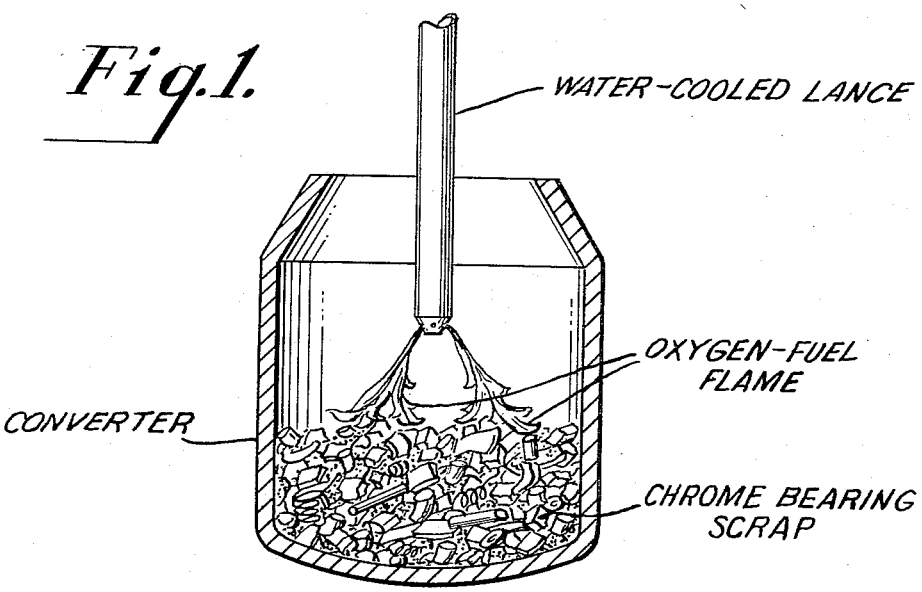
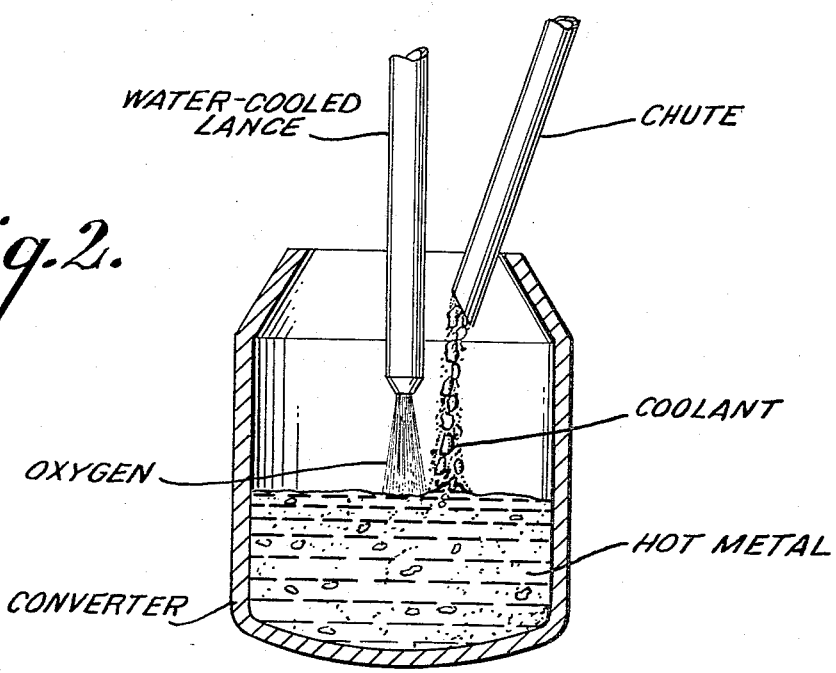

This invention relates to the production of chromium steels and more particularly, to the production of chromium steels of the stainless types employing one or more oxy-fuel lances in reverberatory and converter-type furnaces.

Stainless steels are presently produced in electric furnaces, namely, electric-arc and high-frequency induction furnaces, under very carefully regulated conditions to maintain high chromium content in the final product. The typical method of stainless manufacture for the 0.08 percent maximum carbon type consists in charging ordinary carbon scrap and virgin nickel with iron ore or scale into an electric furnace. After oxidizing the charged material to a sufficiently low carbon content, carbon free ferro chromium is added for the entire chromium requirement. The 0.12 percent maximum carbon grades have been made using approximately 30 to 40 percent of the tapped weight as stainless scrap and adding large quantities of iron ore or scale to the charge.

The economical recovery of the chromium is stainless scrap, however, has presented a very real challenge to operators of electric furnaces due to the inherent chemical relationships which exist in chromium-nickel-carbon-iron alloys (as well as in other stainless alloys containing manganese, silicon, molybdenum, etc.) and the critical temperature requirements during stainless steel production. A few of the problems which have arisen with the electric furnace practice are enumerated as follows:

(1) The scrap has to be carefully prepared since it is difficult to reduce carbon in the electric furnace. Moreover, oily scrap and turnings are very objectionable in this type of practice because of the resulting high carbon content.

(2) The reduction of the carbon content is a relatively high temperature reaction, but chromium becomes oxidized at low temperatures. Consequently, large quantities of chromium are oxidized to chromic oxide in the electric furnace during melt down.

(3) Large slag volumes are common when stainless steel is produced in electrical furnaces and a high percentage of chromium is lost in the slag.

(4) Long heat times are required in the typical electric furnace, which in turn adversely affects banks and bottom refractory life.

Recently, a new steel making process utilizing the LD converter has made the production of plain carbon and low alloy steels possible at lower costs than previously obtained employing conventional open hearth or electric furnaces. In this process, pure oxygen is injected through a water-cooled jet onto molten iron placed in a refractory lined closed-bottom converter vessel.

It has been considered virtually impossible, however, to produce stainless alloys in reverberatory or converter type furnaces since, as previously indicated, chromium under normal furnace conditions oxidizes at a rate that is much faster than that at which carbon oxidizes. Accordingly, by the time the carbon content has dropped to the required amount there is very little chromium from the scrap left in the bath. Moreover, the extremely fast carbon reduction obtained by using an oxygen jet tends to produce a melt that is very difficult to control.

It is an object of the present invention to provide a process for the production of chromium steels in reverberatory and converter-type vessels.

It is another object of the invention to provide a method for the production of chromium steels employing oxy-fuel lances.

It is a further object of the present invention to provide a method for the production of chromium steels at much faster rates and lower costs than possible in electric furnaces.

Other objects and advantages of the invention will become apparent from the following description.

In accordance with the present invention, chrome-bearing steel scrap is charged into a closed-bottom converter vessel of the reberberatory or converter-type (including but not limited to L–D, Kaldo and Rotor furnaces). At least one water-cooled lance is lowered into the vessel and an oxygen-fuel flame is introduced through said lance. The combustion products are adjusted by regulation of the oxygen-fuel ratio. In order to maintain high heat rate and at the same time obtain the desired oxidation levels in the charge, the molar ratio of oxygen to fuel is maintained between 1.3:1 to 2.2:1. As a result of this careful control of the oxy-fuel ratio and the rapid heating obtained from the high temperature flame, it has been found that oxidation of the scrap is minimized.

When the scrap is heated sufficiently, i.e., to 2400° F. and preferably higher, blast furnace hot metal is charged into the converter vessel. Elements in the blast furnace iron such as silicon, as well as some manganese and possibly some carbon, react with the hot scrap. Chromium oxide formed in the scrap during heating is reduced by the silicon and the resulting silica ($SiO_2$) passes off into the slag. If considerable oxide is formed during the scrap melting period, some of the manganese in the iron also reacts with the oxide forming a manganese oxide which also passes into the slag.

Depending upon the slag composition and fluidity, additions of lime and/or other fluxing agents may be made. To conserve the high temperature heat, lime necessary as flux is charged at least in part as burned lime— which is essentially calcium oxide. In this manner, heat required to drive $CO_2$ out of limestone is saved. Relatively expensive chromium in the metal bath is obtained by the addition of chrome ore which is reduced by silicon and manganese in the iron. Following such additions, it is generally desirable to remove all or a portion of the slag from the vessel. After removal of the slag, lime or limestone may again be added.

The flow of fuel to the lance is then reduced or discontinued. Simultaneously, the temperature of the metal remaining in the vessel is increased very rapidly to a temperature sufficiently high for efficient further processing—at least 2800° F. This increase in temperature is obtained by the introduction of substantially pure oxygen (i.e., so-called tonnage oxygen) at very high rates (e.g., up to 30,000 s.c.f./min./lance) through the oxygen-fuel lance into the molten metal bath. The added oxygen oxidizes remaining impurities—largely silicon, manganese and carbon.

At this point, the tip of the lance will usually be located about 6" above the surface of the remaining slag, although this specific distance is adjusted between 0 to 9 feet for each particular set of conditions—such as rate of oxygen flow, depth of slag layer, angle of the lance nozzles and velocity of the escaping oxygen. The distance between the lance tip and the surface of the molten metal is adjusted to obtain maximum utilization of the oxygen stream for the elimination of the metalloids such as carbon, silicon, phosphorus, and sulfur from the bath with a minimum of errosion of refractories and loss of iron as iron oxide fume.

Since it is known that oxidation of carbon and chromium depend upon the temperature of the iron, consideration of the influence of temperature is most important during the metalloid oxidation. At 2800° F. carbon is oxidized preferentially to the chromium and since the temperature of the metal is progressively increased during the oxygen blow (due to further oxidation of silicon, manganese and carbon) an extremely high percentage of the more expensive chromium remains in the bath.

In some instances, the temperature of the bath has a tendency to become too high even when the flow of oxygen is eliminated or conducted at a reduced rate. Control of the temperature of the vessel is then brought about by periodic additions of coolants such as stainless steel scrap, plain carbon steel or ore depending on the final desired temperature and bath chemistry. Typically, such coolants are added when the temperature is in excess of 3200° F.

When the desired tap carbon (between 0.07 to 0.10% by weight) and temperature level 2800 to 3000° F. and more desirably between 2850 and 2900° F.) are reached, oxygen is shut off and the lance is raised. Molten metal in the vessel is then tapped into teeming ladles. If desired, the chemistry of the metal may once again be adjusted by addition of chromium, nickel, molybdenum or other metals and/or alloys, according to various known bulk or fluidized techniques. For example, the additions can be placed in the bottom of the teeming ladle prior to tapping the furnace. From this point, conventional practices are followed and the metal is teemed into ordinary ingot molds.

Some of the advantages of this process are obvious from an operational standpoint. Stainless steels can be produced at much higher rates and at lower costs compared to those previously obtained using electric furnaces. Large quantities of blast furnace iron (up to 70% and preferably in an amount varying between 30 to 70%) can be used in the processing. This results in an important saving since silicon and manganese in the blast furnace iron can be used to effect reduction of chrome oxides. Thus silicon and manganese impurities which have to be removed in steel processing are made to serve a useful function. In electric furnace steelmaking, only minimum blast furnace iron can be used (<20%) and reduction of chrome oxides is effected by addition of more expensive silicon bearing alloy additives such as chrome silicide.

During decarbonization, carbon escapes from the bath as CO gas which in turn is oxidized to $CO_2$ by air. Electric furnaces, however, are not designed for gas removal and accordingly, the charge to such furnaces (particularly the carbon content) must be carefully controlled. With too high a carbon content, gas evolution can be violent enough to blow flame and/or metal out of the furnace. Also, the heat from a large amount of gas can damage the furnace structure if it escapes through the electrode holes.

The high agitation levels resulting from the oxygen addition and the elimination of air contacting the metal results in an improved cast product. During the latter stages of the blowing period, however, oxygen may, if desired, be replaced by a nitrogen-containing mixture such as air to increase the nitrogen content of the steel. Overheating of ferritic and austenitic stainless steels causes excessive grain growth making the material susceptible to tears and cracks and additions of nitrogen helps to prevent this grain growth.

A preferred embodiment of the invention is illustrated in FIGS. 1 and 2. FIG. 1 is a highly simplified schematic illustration showing a converter-type vessel such as an LD converter, containing chrome-bearing scrap and having a water cooled oxy-fuel lance capable of directional adjustment inserted therein. FIG. 2 is a highly simplified schematic drawing showing the injection of oxygen through a water-cooled lance into a converter-type vessel containing molten metal and a separate means for controlling the temperature of hot metal in said vessel.

Referring to FIG. 1, the converter-type vessel containing chrome-bearing scrap metal is rapidly heated to about 2400° F. by the oxy-fuel flame. The height of the lower tip of the lance is adjusted to secure the most effective melting of the scrap and is generally less than three feet above said scrap. Gaseous, liquid or even solid fuels may be employed in the practice of this invention. Gaseous fuels such as methane and propane are preferred however. Solid fuels, even fine grain materials such as coke breeze and coal dust, react more slowly with oxygen than either oil or gas. When the scrap has heated sufficiently, blast furnace hot metal and other additives are charged to the converter.

Although from a production standpoint, the scrap can be preheated initially in electric furnaces, induction furnaces or by other means prior to charging it into the converter-type vessel, use of the oxy-fuel flame presents a rapid method which is more suited for production installations. In addition, the long practice of drying all additions to electric furnaces to prevent hydrogen pick-up from moisture is not required.

Accordingly, not only is it possible to charge large quantities of scrap to the converter vessels which in time contributes to improved chromium recovery, but a shortening of the heat time is obtained (increasing tons/hr.). Initial material handling costs are lowered and there is also less slag present. Moreover, the rapid heating traps less gases in the metal.

After removal of all or a portion of the slag from the vessel, oxygen is injected into the bath as shown in FIG. 2. While temperature control is maintained in part by the rate of oxygen introduction, the extremely fast carbon reduction which results tends to produce a melt that sometimes requires addition of metal scrap or other coolant by suitable means such as the chute shown in this figure.

Oxygen is shut off and the lance is raised upon reaching the desired carbon and temperature tap level. The molten metal is then tapped and teemed into ingot molds.

The invention is further clarified by reference to the following examples.

*Example I*

32 lbs. of Type 304 stainless steel scrap was placed into a vessel and heated with two water-cooled oxygen-propane lances.

After heating the scrap to approximately 2400° F., 450 lbs. of iron was added to the vessel. A water-cooled oxygen lace was lowered to about 4″ above the surface of the bath and oxygen was injected into the bath at a rate of 8800 c.f.h. Following 15 minutes of oxygen addition, the composition of the metal in the bath was compared with the starting analysis of the added metal. This comparison is set forth in the following table:

| Constitutent: | Starting Analysis of the metal (percent) | Final Analysis of the metal (percent) |
|---|---|---|
| C | 3.46 | 0.78 |
| Si | 2.35 | 0.27 |
| Mn | 0.66 | 0.08 |
| S | 0.06 | 0.01 |
| Ni | 0.00 | 0.03 |
| Cr | 0.00 | 0.77 |

In general, lance life for this type of operation varies from 80 to 2000 heats—depending on vessel size, cooling water flow and height above the bath among other factors. Average lance life has been found to be about 500 heats.

Example II

A preheated converter-type vessel was charged with:

|  | Lbs. |
|---|---|
| Burned lime (bottom of vessel) | 17.5 |
| High carbon ferrochrome | 20.0 |
| Silicomanganese | 10.0 |
| Nickel | 10.0 |
| Stainless steel scrap (Type #304) | 14.0 |
| and |  |
| Burned lime (top of vessel) | 13.0 |

Three oxy-fuel lances were lowered into position above the cold charge materials and utilized to heat said charge materials for one hour. Immediately after this heating operation was completed, a total of 291 lbs. of cupola pig iron having a temperature of 2580° F. was charged to the preheated material in the converter vessel.

Following the addition of the pig iron, a water-cooled oxygen lance was lowered to the slag level within the reaction vessel and high purity oxygen was introduced at a flow rate of 2500 s.c.f.h. After a total of 3850 cu. ft. of oxygen per ton of charged material had been introduced, the flow of oxygen was discontinued and the oxygen lance raised.

The resulting melt was tapped and allowed to solidify.

Example III

Following the procedure of Example II, a converter vessel was charged and heated. To the preheated charge, 30 lbs. of burned lime was added followed by 324 lbs. of cupola pig iron.

Oxygen was then injected at a rate of 2500 s.c.f.h. through a water-cooled oxy-fuel lance positioned 4" above the slag level. After a total of 2280 s.c.f. of oxygen had been consumed per ton of charged materials, oxygen injection was terminated. The resulting melt was tapped and permitted to solidify. The stainless steel obtained is comparable to the best electric furnace grades.

Obviously, many modifications and variations of the invention as hereinbefore set forth may be made without departing from the spirit and scope thereof, and therefore only such limitations should be imposed as are indicated in the appended claims.

What is claimed is:

1. The method for producing ferro-alloys which comprises: charging chrome-bearing steel scrap to a converter-type vessel, heating said scrap rapidly with at least one oxy-fuel lance to a temperature of at least 2400° F. with minimum oxidation, charging molten blast furnace iron containing silicon to the resulting molten metal bath in the converter-type vessel to effect reduction of chrome oxide formed during the heating of the chrome-bearing steel scrap, and increasing the temperature of the molten metal bath to at least 2800° F. by the injection of at least oxygen into the converter vessel thereby effecting reduction of remaining impurities in the melt.

2. The method for producing ferro-alloys which comprises: charging chrome-bearing steel scrap to a converter-type vessel, heating said scrap rapidly to a temperature of about 2400° F. with at least one oxy-fuel lance, charging molten iron scrap containing silicon to resulting molten metal bath in the converter-type vessel to effect reduction of chrome oxides formed during the heating of the chrome-bearing steel scrap, increasing the temperature of the molten metal bath to at least 2800° F. by injection of oxygen through at least one lance into the converter vessel thereby effecting reduction of remaining impurities in the melt and shutting off the flow of oxygen when a temperature of about 3000° F. is reached.

3. The method for producing chromium steels of the stainless types which comprises: charging chrome-bearing steel scrap to a converter-type vessel, heating said scrap rapidly to a temperature of about 2400° F. with at least one oxy-fuel lance, charging molten iron scrap containing silicon to the converter-type vessel to effect reduction of chrome oxides formed during the heating of the chrome-bearing steel scrap, gradually reducing the flow of fuel to the oxy-fuel lance, adding burned lime to the reaction vessel and increasing the temperature of the molten metal bath to at least 2800° F. by the injection of oxygen through at least one lance into the converter vessel thereby effecting reduction of remaining impurities in the melt.

4. The method for producing chromium steel of the stainless type which comprises: charging chrome-bearing scrap to a metallurgical furnace, heating said scrap rapidly to a temperature of at least 2400° F. with at least one oxy-fuel lance, charging molten metal scrap containing silicon to the furnace to effect reduction of chrome oxides formed during the heating of the chrome-bearing scrap, reducing the flow of fuel to the oxy-fuel lance while continuing the flow of oxygen until the temperature of the bath has reached at least 2800° F., discontinuing the flow of oxygen and fuel to the furnace and tapping the resulting melt.

5. The method of claim 1 wherein the oxygen and fuel employed to heat the chrome-bearing steel scrap to a temperature of at least 2400° F. are maintained in molar ratio of oxygen to fuel between 1.3:1 and 2.2:1.

References Cited

UNITED STATES PATENTS

| | | | |
|---|---|---|---|
| 1,063,280 | 6/1913 | Morehead | 75—12 |
| 1,444,062 | 2/1923 | Carney | 75—60 |
| 1,513,735 | 11/1924 | Bigge | 75—52 |
| 1,586,590 | 6/1926 | Wild | 75—60 |
| 1,835,925 | 12/1931 | Becket | 75—27 |
| 2,986,459 | 5/1961 | Udy | 75—40 |
| 3,172,758 | 3/1965 | Jandras | 75—60 |
| 3,194,650 | 7/1965 | Kurzinski | 75—60 |
| 3,218,157 | 11/1965 | Dobrowski et al. | 75—60 |
| 3,232,748 | 2/1966 | Rinesch | 75—60 |

BENJAMIN HENKIN, *Primary Examiner.*

DAVID L. RECK, *Examiner.*